UNITED STATES PATENT OFFICE.

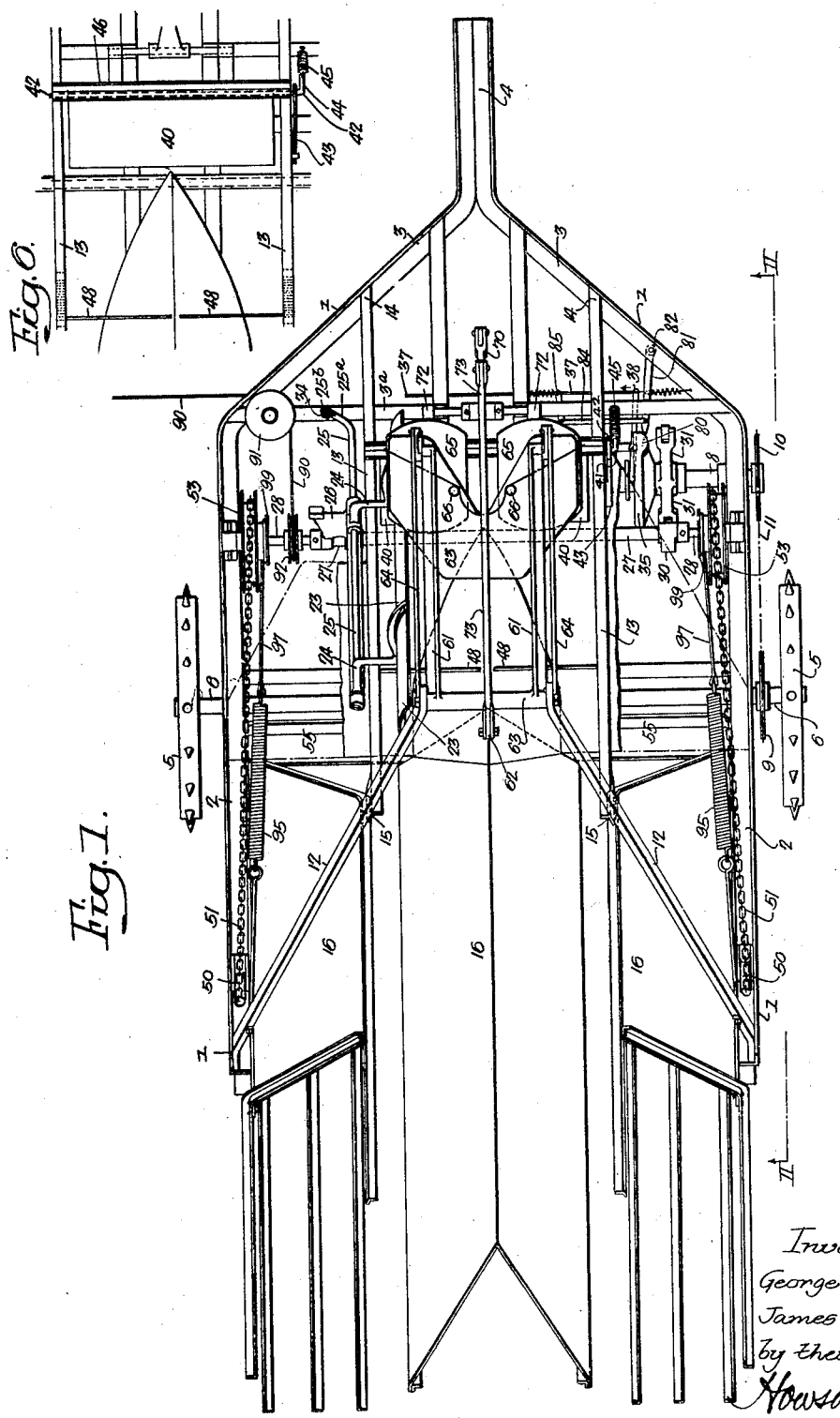

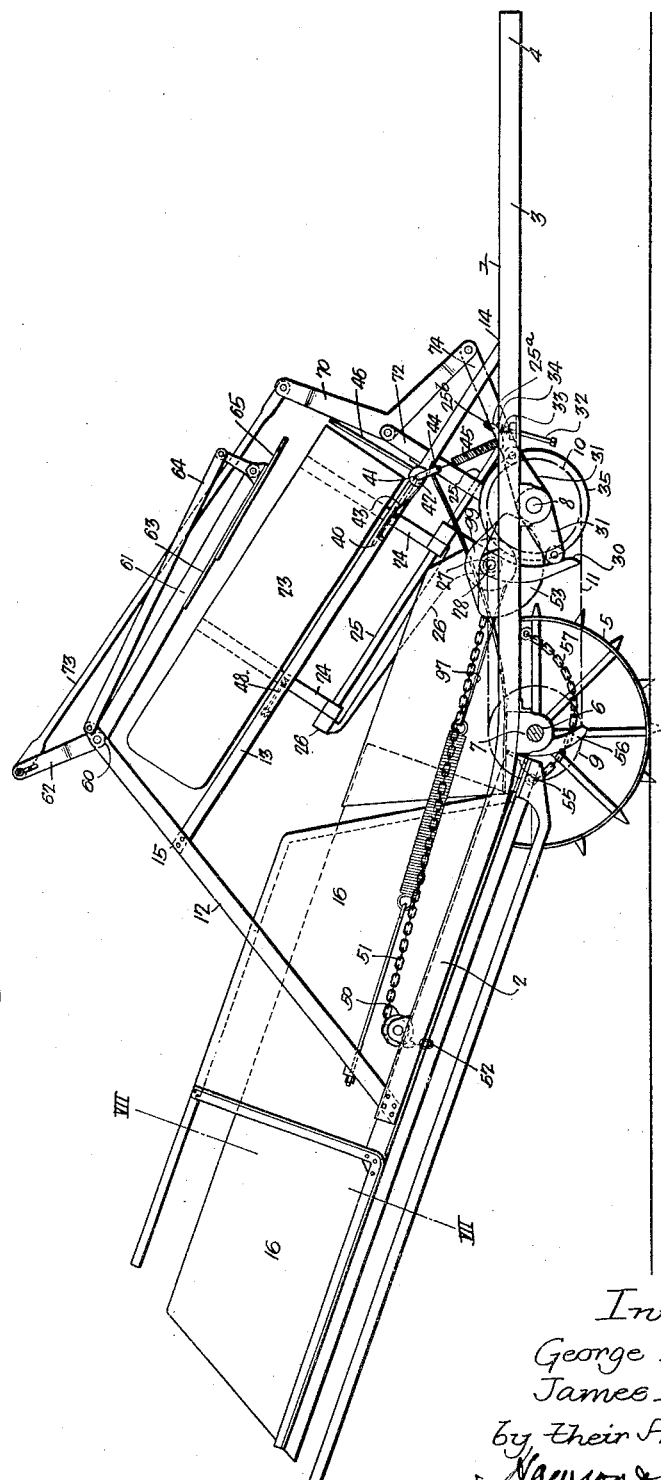

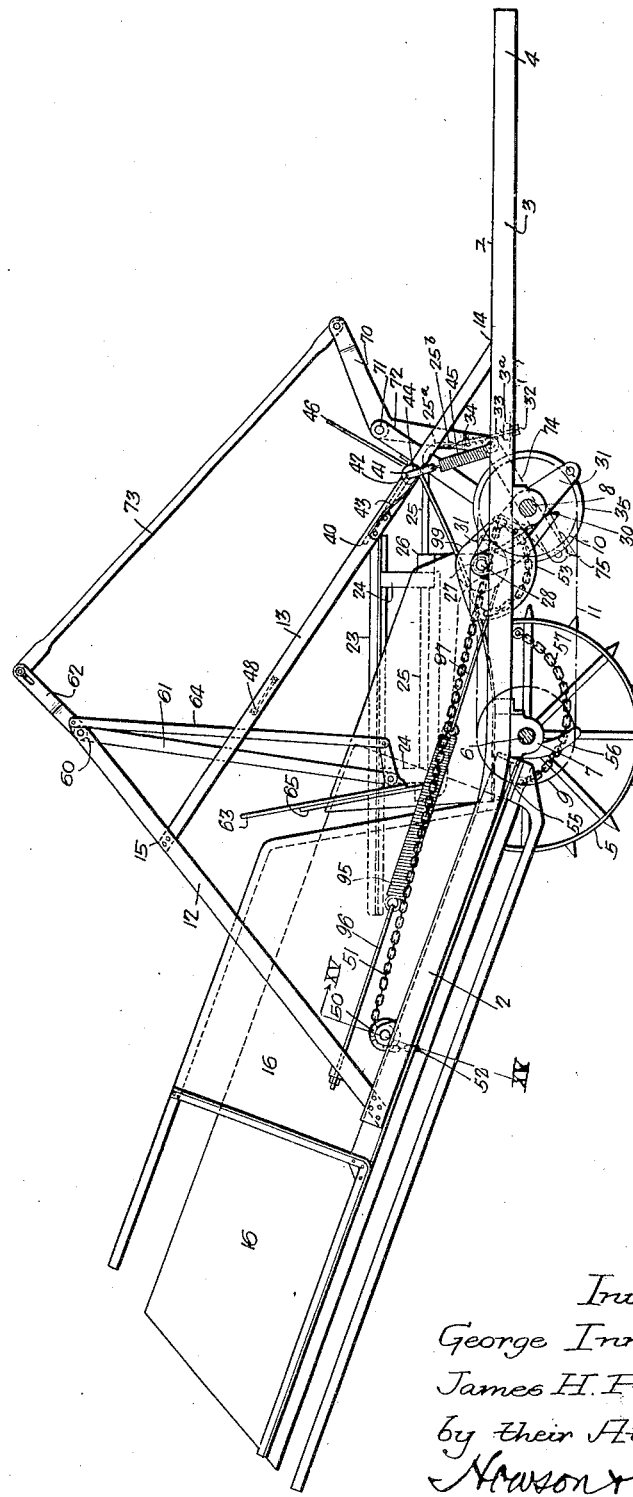

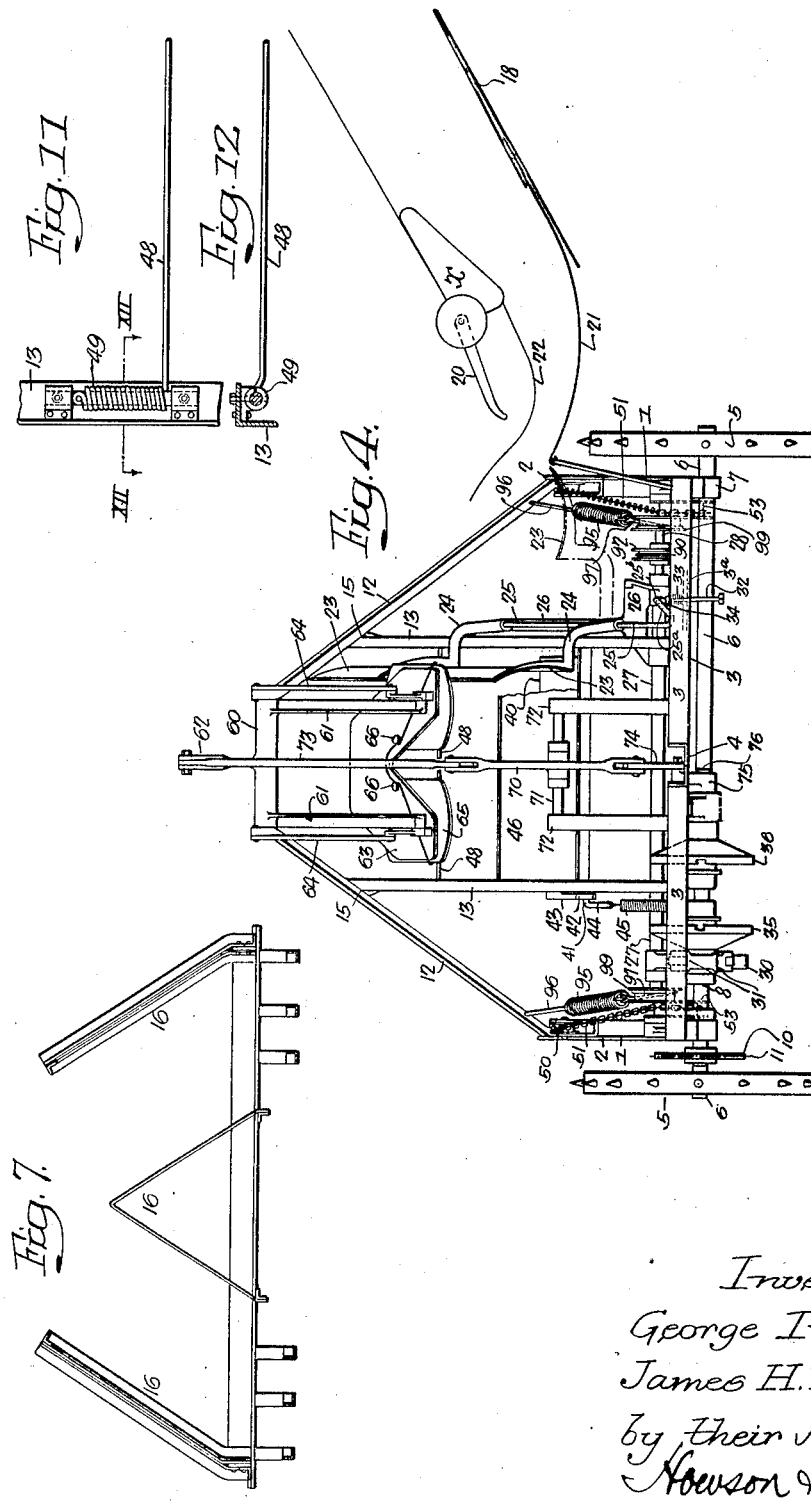

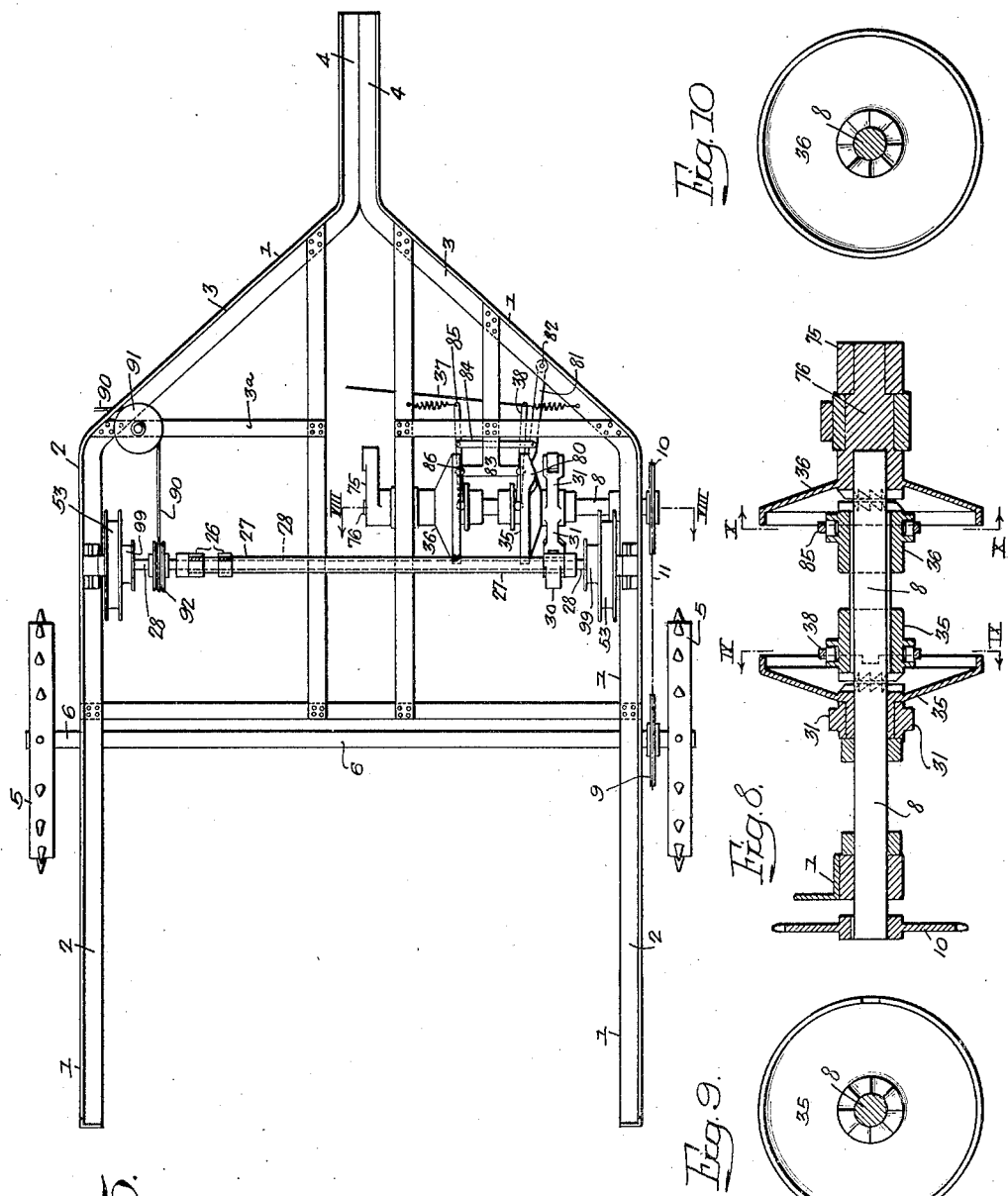

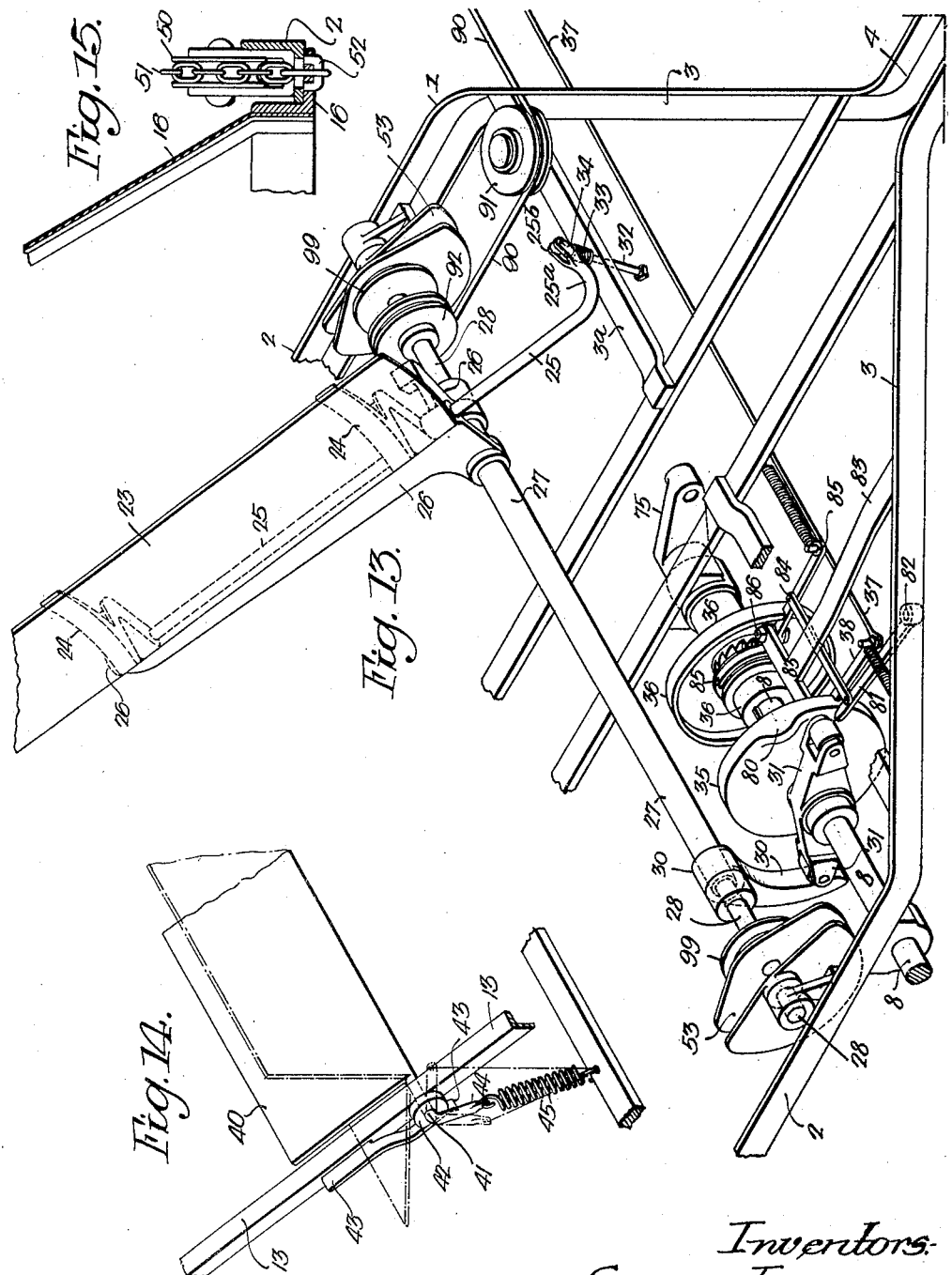

GEORGE INNES AND JAMES H. PRALL, OF PHILADELPHIA, PENNSYLVANIA.

GRAIN-SHOCKER.

1,346,543.  Specification of Letters Patent.  Patented July 13, 1920.

Application filed September 5, 1917. Serial No. 189,775.

*To all whom it may concern:*

Be it known that we, GEORGE INNES and JAMES H. PRALL, citizens of the United States, and residents of Philadelphia, Pennsylvania, have invented certain Improvements in Grain-Shockers, of which the following is a specification.

Our invention relates to means for disposing bundles or sheaves of grain formed by any form of harvesting binder in shocks; our present invention comprising a machine adapted to receive the bundles of grain from the binder, pass them to a shock-forming basket, and then, when the latter is filled, it may be lowered for the purpose of depositing the shock upon the ground.

Our improved structure comprises a suitable framework to be hauled over the field with the harvester and binder; such frame work carrying the shock-forming basket and having means for receiving sheaves from the binder and delivering them to said shock-forming basket.

These and other features of our invention are more fully described hereinafter, reference being had to the accompanying drawings, in which:

Figure 1, is a plan view of an improved shock-forming machine forming the subject of our invention.

Fig. 2, is a side elevation of the same showing the parts in one position.

Fig. 3, is a view similar to Fig. 2, showing the parts of the mechanism in another position.

Fig. 4 is a front elevation of the machine.

Fig. 5, is a plan view of the lower portion of the running gear.

Fig. 6, is a fragmentary plan view illustrating a detail of our improved structure.

Fig. 7, is a sectional view of the crib or basket taken on the line VII—VII, Fig. 2.

Fig. 8, is an enlarged sectional view of our improved clutch mechanism, taken on the line VIII—VIII, Fig. 5.

Figs. 9 and 10, are face views of the respective clutch disks shown in Fig. 8, on the lines IX—IX and X—X.

Fig. 11, is an enlarged view of a supporting arm employed with the improved mechanism.

Fig. 12, is a sectional view on the line XII—XII, Fig. 11.

Fig. 13, is a perspective view illustrating in detail part of the operating mechanism.

Fig. 14, is a detail perspective view illustrating a further detail, and

Fig. 15, is a sectional view on the line XV—XV, Fig. 3.

Our present structure comprises a frame 1, which may be made of angle iron, or may be of other suitable metal construction, comprising longitudinal side portions 2, which are turned to form angular forwardly projecting portions 3, the extreme ends of which meet and are connected together to form a tongue as indicated at 4; such tongue portion being connectible to the binder truck by any suitable means.

The main frame is supported by wheels 5 carried by a shaft or axle 6, suitable journaled in bracket bearings 7, secured to the side portions 2, of said frame, and from this shaft power may be applied to a countershaft 8, by means of suitable sprocket wheels 9 and 10, and chain 11, which elements are illustrated diagrammatically in the drawings.

Disposed above the main frame is a supplemental frame comprising angularly disposed struts 12, extending from the rear ends of the side portions 2, and forwardly extending struts 13, which are connected to the angular forwardly projecting portions 3 of the frame at the points 14, and to the struts 12, at the points 15; these several members forming supporting means for the several levers and other parts of the mechanism hereinafter described and designed to handle the sheaves as they are delivered from the binder structure and pass them to the shock-forming crib or basket 16 operatively connected to the rear of the main frame 1.

The frame of the shocker is disposed in such position with respect to the binder that the sheaves delivered by the binder are presented at the side of the same, and in Fig. 4, we have illustrated diagrammatically the binder platform 18 along which the cut stalks of grain pass to the knotter mechanism $x$, indicated diagrammatically, at which point the sheaf is formed.

Immediately following the tying of the sheaf, the same is engaged by an arm 20, rotated by suitable means, (not shown), so as to sweep said sheaf from a runway 21 leading from the binder platform and under spring arms 22, onto a tiltable sheaf-receiving table 23 carried by the main frame. This table is preferably concaved, as shown, and is carried by a pair of arms 24, secured to a rod 25, journaled in a frame 26; the forward end of which frame is fixed to a sleeve 27 disposed at right angles to the direction of movement of the table and journaled on a cross shaft 28, carried by the main frame of the machine.

The bundles or sheaves are received on the table 23 when the latter is in the position indicated by dotted lines in Fig. 4. To deliver this sheaf to a position from which it is thrown into the basket, we provide means for elevating said bundle-receiving table 23 so that it not only throws the sheaf into proper distributing position with relation to the shock-forming basket, but up-ends such sheaf to insure that its rearward movement will be in proper position or relation with respect to the basket to receive the same.

The sleeve 27 of the pivoted frame 26 is provided with a cam arm 30, which lies in the path of arms 31, 31, on the countershaft 8, and as the arms 31 are rotated by the shaft 8, they act upon the cam arm 30 and turn the sleeve 27, and raise the frame 26 with the table 23 to the angular position indicated in Figs. 2, 4 and 13. The rod 25 upon which the arms 24 of the table 23 are pivotally mounted is extended forwardly, as shown in Figs. 1, 2, 3 and 4, and has its forward end cranked at $25^a$, which end is connected at $25^b$ to a loose bolt 32 arranged to pass through one of the bracing members $3^a$ of the frame, which bolt has on its lower end a head $32^a$, while a spring 33 is interposed between said brace member $3^a$ and a collar 34 carried by the bolt just below the connection with the cranked end $25^a$ of the rod 25.

As the table 23 is moved to the position shown in Figs. 2 and 4, the spring 33 is compressed slightly until the connection of the bolt 32 with the cranked end $25^a$ of the rod 25 passes the axis of rotation of the latter, when the spring 33 will be extended; raising the cranked end of said rod 25 and maintaining the table 23 in the elevated position. The rod 32 has a loose connection where it passes through the frame so that it is capable of responding to the movement of the crank arm and assuming different positions with respect thereto.

Mounted on the countershaft 8, are a pair of clutches, one of which, that indicated at 35, being operated twice in succession, and upon its second operation sets in motion means which operate the second clutch, indicated at 36; the first mentioned clutch 35, controlling the movement of the table 23 to delivery position, and the second clutch 36 controlling the movement of the arms designed to sweep the sheaves from their supplemental supports to which they have been delivered by said table 23 into the shock-forming basket, and being operated after the second sheaf is in place. This action is substantially as follows:

Upon the formation of the bundle by the tying means, such mechanism exerts a pull upon a cord 37, connected to a lever 38, which throws into operative position the clutch 35. As soon as this is in operative position, the countershaft 8 imparts movement thereto and with it the arms 31, one of which is thrown into engagement with the cam arm 30, on the sleeve 27, movable on the cross shaft 28; thereby effecting the tilting of the table 23, to discharge a bundle therefrom onto the supplemental supports for the same. Immediately following this action, said table 23, drops back into its initial position, a second sheaf is tied; such tying mechanism again operating the cord 37, which imparts further movement to the clutch 35, the cam arm 30 is again actuated as before, and a second bundle is thrown onto the preliminary supporting means, pushing the first to one side so that the pair of bundles lie side by side ready to be pushed into the shock-forming basket, as hereinafter described.

From the bundle-receiving table 23, the sheaves are delivered to supporting means, the butts lying upon a shelf 40, carried by a pivotally mounted rod 41, having a disk 42 with a flattened side; a spring 43, underlying the disk so as to yieldingly support the shelf; the end of the said rod 41 being cranked at 44, and connected to the frame by a spring 45, so as to restore the shelf to a normal position after sheaves deposited thereon have been removed. At the back of the pivoted shelf 40, a fixed board 46, is provided against which the butt ends of the sheaves rest and maintain their alinement.

To support the heads of the sheaves, we provide spring arms 48, more clearly shown in Figs. 11 and 12, having spring connections 49, with the forwardly extending struts 13, of the supplemental frame so that they will be supported thereby preliminary to the action of the means employed for sweeping said sheaves into the basket at the rear of the structure.

The basket or crib receiving the bundles is supported at the rear of the frame; the latter being provided with a pair of grooved wheels 50, over which chains 51 pass; said chains being secured to the frame at 52, and connected at their forward ends to segmental drums 53 carried by the shaft 28. The forward end of the basket or frame engages at 55 with stops or abutments 56 on the frame adjacent the axle thereof. In addition, a chain 57 is connected between the frame and the front center portion of the basket which serves as the tractive means for the basket during the brief intervals the latter is on the ground in the act of depositing a shock.

When the sheaves are brought to the supplemental supporting means by movement of the tilting table 23, they are then in position to be engaged by the means for placing them in the crib or basket, which means are substantially as follows:

Pivoted to the top of the supplemental frame is a lever 60 having a pair of arms 61, extending forwardly, and a single arm 62, extending substantially in an upward direction. The arms 61, are connected together by a cross plate 63, being also connected to the struts 12 by means of links 64, and to this cross plate a pair of sweep plates 65 are pivoted at 66.

To operate this sweep mechanism, we provide a bell crank lever 70, at the front of the machine pivoted at 71, to struts 72, extending upwardly from the frame; the upper end of said bell crank lever being connected to the upwardly disposed arm 62 by a link 73, while the lower end of the bell crank lever is connected by an arm 74, to a crank 75, carried by the extended hub 76 of the clutch 36 mounted on the end of the countershaft 8, as clearly shown in Fig. 8.

After both arms 31, have been successively operated to engage the cam arm 30, and actuate the tiltable table 23, to deposit the sheaves on the supplemental supporting means, the clutch 35, has made one complete revolution. Carried by this clutch is a lug 80, and upon completing such revolution, this lug comes into contact with a lever 81, pivoted at 82 to the frame 3; said lever 81 being connected by a link 84 to a lever 85 pivoted at 86 on a bracket 83 supported by the main frame for operating the clutch 36, so that the latter will act to operate the crank 75 on the extended hub 76 at the end of the countershaft 8 and thereby operate the mechanism controlling the sweep plates 65 to move the pair of bundles from their supplemental supporting means and deliver them to the shock-receiving basket; the supports yielding as the sweep plates move in either direction, and returning to their normal position due to the location of the spring 45, see Fig. 14.

This action continues as long as sheaves are fed to the same, and when the basket is filled, the shaft 28 is rotated by pulling on the cord 90; the latter passing around a guide roller 91, and thence to a sheave 92 on the shaft 28, to which it is connected. The cord 90 is preferably connected to a foot treadle or other suitable means convenient to the operator so that it may be actuated at the desired time to drop the shock-forming basket and deposit upon the ground the shock formed therein.

When the cord 90 is actuated to cause the basket to deposit a shock on the ground, such basket will drop, and the butts of the grain engaging the ground will stick to the same while the basket is pulled along with the shock-forming structure; the operator holding the cord so that the basket is maintained in the lowered position until it is clear of the shock. When this occurs, it may be automatically raised by springs 95 which are interposed between rods 96 connected to the struts 12 of the frame and chains or cords 97 which are connected to the forward ends of said springs and pass partly around small pulleys 99 on the shaft 28; such pulleys being preferably formed with the segmental drums 53. The springs exert movement to turn the shaft 28 and cause the drums 53 to wind up the chains 51, thereby raising the basket into position. In this operation, the end 55 of the basket engages and fulcrums on the abutment 56.

We claim:

1. In a grain shocker, the combination of a frame, traction wheels therefor, a basket disposed at the rear of said frame, a tiltable receiving member at the side of said frame, means for delivering sheaves thereto, inclined supplemental means for receiving sheaves from said tiltable member, means for actuating the latter twice in succession to deliver one sheaf after another to said supplemental receiving means which holds two sheaves, and downwardly and rearwardly operating sweep plates for moving the sheaves in groups of two rearwardly from said supplemental means to the basket; said supplemental receiving means being yieldingly supported for the passage of said sweep plates.

2. In a grain shocker, the combination of a frame, traction wheels therefor, a basket disposed at the rear of said frame, a pivotally mounted table receiving the sheaves, means for operating said table, supplemental supporting means receiving the sheaves therefrom; said supplemental supports having a yieldable connection with the frame, and a downwardly and rearwardly operating swinging member for moving said sheaves from the supplemental supports into the basket; said supplemental receiving supports permitting movement of the swinging member past the same in both directions.

3. The combination, in a shocking machine, of a main frame, a supplemental frame carried thereby and disposed in an inclined position; said supplemental frame comprising members having a flexible connection with the main frame, a basket disposed at the rear of the main frame, a tiltable member for carrying a sheaf from the binder platform and delivering it from a horizontal position to an inclined position on the supplemental support, means for operating said tiltable member, and a swinging member for transferring the sheaf from said inclined supplemental support to the basket; said swinging member serving to depress the butts of the sheaves on the inclined supplemental support so that they will stand in a substantially vertical position with respect to the bottom of the basket, and the supplemental support being moved out of the way by the action of the swinging member.

4. The combination, in a grain shocker, of a basket, a tiltable receiving table, a supplemental frame to which the sheaves are delivered by said tiltable structure, a swinging member for moving the sheaves from said supplemental frame and delivering the same to the basket, and means whereby said tiltable structure may be operated twice to every operation of the swinging member so that the latter will deliver a pair of sheaves to the basket.

5. In a grain shocking machine, the combination of a main frame, a basket carried at the rear of the same, a supplemental frame, a tiltable member, supplemental supporting means carried by the supplemental frame, means for effecting the successive delivery of a pair of sheaves to said supplemental supporting means, a swinging member for sweeping the pair of sheaves from said supplemental supporting means into the basket, and means for operating said swinging member directly following the deposit of a pair of sheaves on the supplemental supporting means.

6. In a grain shocker, the combination of a main frame, a supplemental frame and supplemental supporting means carried by the supplemental frame, said means including a pair of spring-supported arms and a spring-supported shelf disposed forwardly of said arms, and a swinging member for moving the sheaves rearwardly, said supplemental supporting means permitting the passage of said swinging member in its forward and return movements.

7. In a grain shocker, the combination of a frame, traction wheels therefor, a crib or basket disposed at the rear of said frame, a pivotally mounted table receiving the sheaves, means for operating said table, supplemental supports receiving successively a pair of sheaves therefrom, a swinging member for moving said sheaves into the basket, and means for operating the latter in timed relation to the movements of the pivotally mounted table; the swinging member being actuated after each pair of movements of the pivotally mounted table.

8. In a grain shocker, the combination of a frame, supporting means therefor, a crib or basket disposed at the rear of said frame, a shaft, a pair of segmental drums, guide wheels carried by the frame, chains connected to said drums and to the basket and passing over said guide wheels, and spring counterbalancing means for holding said drum to support the basket in the elevated position, said spring counterbalancing means serving also to return the basket to the elevated position after a sheaf has been deposited upon the ground.

9. The combination, in a shocking machine, of a main frame, a supplemental frame carried thereby and disposed in an inclined position, supplemental spring supports carried by said supplemental frame, a basket disposed at the rear of the main frame, means for transferring a sheaf from the binder platform and delivering it from a horizontal position to an inclined position on the spring-supports of the supplemental frame, and a swinging member for transferring the sheaf from said inclined support to the basket, said swinging member serving to depress the butt of the sheaf so that it will stand in a substantially vertical position with respect to the bottom of the basket, and means for operating said swinging member in timed relation to the means which transfer the sheaves from the binder platform to the spring supports of the supplemental frame.

10. The combination, in a grain shocker, of a main frame having a power shaft, a shock-forming basket carried at the rear end of said main frame, a counter shaft operatively connected to said power shaft, a pair of clutches on said counter shaft, a tiltable member for receiving sheaves pivotally mounted at the side of the main frame, means for operating said tiltable member, a shaft, 27, a sleeve thereon operatively connected to the tiltable member, a cam arm on said sleeve, an arm on one of said clutches for engaging said cam arm whereby one of the clutches mounted on the counter shaft may be actuated to place said tiltable-member-operating means in active position, means for intermittently connecting the operating arm with said second shaft, a yielding support receiving bundles from said tiltable member, means for operating the tiltable member twice to each rotation of the counter shaft, a swinging member for moving the bundles from said yielding support to the shock forming basket, and means for throwing the second clutch into operation to operate said swinging member at the end of each second operation of the tiltable member.

11. The combination, in a grain shocker, of a main frame, a transverse power shaft thereon having traction wheels, a shock-forming basket carried at the rear end of said main frame, a transverse counter shaft operatively connected to said power shaft, a pair of clutches on said counter shaft, a tiltable member pivotally mounted at the side of the main frame, means for operating said tiltable member from the counter shaft, means for operating one of the clutches mounted on the counter shaft for placing said tiltable-member-operating means in active position, a yielding support receiving bundles from said tiltable member, a swinging member adapted to move the bundles against said yielding support, means for operating the tiltable member twice to each rotation of the counter shaft, and means for throwing the second clutch into operation to operate the swinging member and cause it to deliver a pair of bundles from said yielding support to the shock-forming basket at the end of each second operation of the tiltable member.

12. In a grain shocking machine, the combination of a main frame, a shock-forming basket carried at the rear of the same, a supplemental frame, a tiltable member, spring-supporting means carried by the supplemental frame, means for operating the tiltable table to effect the successive delivery of a pair of sheaves to said spring supporting means, a swinging member for sweeping the pair of sheaves from said spring supporting means into the basket, and means for operating said swinging member directly following the deposit of a pair of sheaves on the spring supporting means.

13. In a grain shocker, the combination of a main frame, a supplemental frame, supplemental supporting means carried by the supplemental frame and comprising a pair of spring-supported arms and a spring-supported shelf disposed forwardly of said arms, a swinging member for moving the sheaves rearwardly, and plates carried by said swinging member for engaging the respective sheaves; said supplemental supporting means permitting the passage of said swinging member in its forward and return movements.

14. In a grain shocker, the combination with a bundle-receiving basket, of a tiltable table adapted to receive bundles of grain for subsequent deposit in said basket, means for operating said tiltable table intermittently, a supplemental support comprising yielding arms for receiving the bundles of grain from said tiltable table; said supplemental support being inclined forwardly, and means carried at the front end of said supplemental support for alining the butt ends of said bundles.

15. In a grain shocker, the combination with a bundle-receiving basket, of a tiltable table receiving bundles of grain for subsequent deposit in said basket, means for operating said table, yielding arms forming supplemental supports receiving the bundles from said table; the plane of said arms being inclined forwardly, a swinging member for moving the bundles rearwardly from said supplemental supports; the latter yielding for the passage of said member, and a guard at the lower and forward end of said supplemental supports for alining the butt ends of the bundles.

GEORGE INNES.
JAMES H. PRALL.